United States Patent [19]

Grothaus et al.

[11] Patent Number: 4,881,134

[45] Date of Patent: Nov. 14, 1989

[54] COMB FILTER FOR THE REJECTION OF INTERTRACK CHROMONANCE CROSSTALK

[75] Inventors: Ulrich Grothaus, Puschendorf; Klaus Lagerpusch, Nuremberg, both of Fed. Rep. of Germany

[73] Assignee: Grundig E.M.V. Elektro-Mechanische Versuchsanstalt, Max Grundig Holland, Stiftung & Co. KG, Furth, Fed. Rep. of Germany

[21] Appl. No.: 170,496

[22] Filed: Mar. 21, 1988

[30] Foreign Application Priority Data

Mar. 28, 1987 [DE] Fed. Rep. of Germany ....... 3710420

[51] Int. Cl.[4] ............................................. H04N 9/79
[52] U.S. Cl. ..................................... 358/328; 358/329
[58] Field of Search ............... 358/21 R, 31, 310, 327, 358/328, 329, 330

[56] References Cited

U.S. PATENT DOCUMENTS 4,480,265 10/1984 Spiero .............................. 358/328 X
4,731,674 3/1988 Fukuda et al. ..................... 358/328
4,752,833 6/1988 Wolber ............................. 358/330 X Primary Examiner—Robert L. Richardson
Attorney, Agent, or Firm—Michael E. Marion

[57] ABSTRACT

In known color-under video recorders intertrack chrominance cross talk is eliminated by comb-filtering of the back-converted chrominance signal. However, if the delay circuit needed in the comb filter is a CCD delay line this will give rise to problems both in respect of production engineering and circuit design. These problems are mitigated by the novel comb filter. Comb filtering is applied to the down-converted chrominance signal. The signal path in which the signal is delayed includes a clocked CCD delay line and a phase correction circuit having a linear frequency response and whose dimensioning is such that the overall delay of the chrominance signal corresponds to the signal periodicity imposed by the signal standard and that the phase shift which occurs in the down-converted signal as a result of the recording standard in conjunction with the signal standard is eliminated. The invention can be applied to PAL video recorders, NTSC video recorders, multi-standard video recorders, and vertical pre-emphasis and de-emphasis in video recorders.

10 Claims, 1 Drawing Sheet

COMB FILTER FOR THE REJECTION OF INTERTRACK CHROMONANCE CROSSTALK

BACKGROUND OF THE INVENTION

The invention relates to a comb filter for the rejection of intertrack chrominance crosstalk during reproduction of a colour video signal using the colour-under method described below.

In all currently commercially available home-entertainment video recorders the colour video signal is recorded in accordance with the colour-under method. In this method the luminance and the chrominance components are first extracted from the composite colour video input signal. In principle, the luminance component is frequency-modulated, high-pass filtered and applied to the first input of an adder stage. The chrominance component is down-converted to a frequency range situated below the frequency-modulated luminance component by means of a frequency converter, is low-pass filtered, and is applied to the second input of the adder stage, where it is combined with the frequency-modulated luminance component. The signal thus obtained is recorded in adjacent inclined tracks on a magnetic tape by means of rotating video heads.

During reproduction the signal is divided into the frequency-modulated luminance component and the down-converted chrominance component by means of a high-pass filter and a low-pass filter respectively. The luminance component is frequency-demodulated, low-pass filtered and applied to the first input of an adder stage. The chrominance component is back-converted, low-pass filtered, applied to the second input of the adder stage and combined with the frequency-demodulated luminance component.

In the above system disturbances in the colour reproduction occur because the reproducing heads not only read the recorded track but also pick up chrominance crosstalk components from adjacent tracks. Therefore, the known systems utilize a comb filter in the path of the reproduced chrominance component to remove crosstalk components originating from the back-converted chrominance component.

Such comb filters, which are known for example from the magazine "GRUNDIG TECHNISCHE INFORMATIONEN", 3-84, pp. 144–150, DE-PS 35 12 546, DE-PS 32 18 538, and EP-APPL. 0,183,438, comprise a first signal path for delaying the reproduced and back-converted chrominance component by a specific time interval one line period in the case of NTSC and two line periods in the case of PAL), a second signal path at whose output the reproduced, back-converted and non-delayed chrominance component is available, and an adder stage for adding the delayed and non-delayed chrominance components to each other.

This addition results in a chrominance signal freed from crosstalk components. Here, use is made of the fact that the colour information in successive lines changes only slightly. The colour information of adjacent lines can therefore be added without a visible deterioration in picture quality. However, in addition to the desired signal components the crosstalk components would then also be added to each other. This is precluded in that prior to recording appropriate phase shifts are applied to the chrominance components to ensure that during said addition the cross-talk components are in phase opposition and consequently cancel one another. How said phase shifts at the recording side are obtained in the case of a PAL signal recorded in accordance with the VHS standard is described in detail, for example, in the aforementioned magazine "GRUNDIG TECHNISCHE INFORMATIONEN". It is obvious that the phase reversals at the recording side must be cancelled during reproduction.

Moreover, DE-OS 3231 150 describes a PAL comb filter in whose first signal path the back-converted chrominance component is delayed by only one line period. In addition, this first signal path includes a PAL phase inverter, which may be of a controllable type, to ensure that, although in accordance with the PAL standard the periodicity of, the signal has a period corresponding to two line periods. The desired comb filtering is obtained, when the non-delayed chrominance component and the chrominance component having a delay of one line period are added.

From the aforementioned DE-PS 35 12 546 it is also known to connect a phase-shift circuit to the output of the delay circuit in the first signal path. The delay in this phase-shift circuit is adjustable and therefore any deviations from the nominal delay of the delay line can be compensated for.

In the majority of the currently commercially available home-entertainment video recorders the delay necessary for comb filtering is provided by a glass delay line. However, such a delay line has certain disadvantages such as undesired reflections, bulk, and the temperature-dependence of the glass.

CCD delay lines can also be used. In comparison with glass delay lines, CCD delay lines have the advantages of a substantially smaller size, an exact delay time, a non-critical adjustment, and the absence of undesired reflections. The delay time attainable by means of CCD delay lines depends on the number of "buckets" and the selected clock frequency.

However, it is found that the use of CCD delay lines in comb filters for filtering chrominance signals at their original frequency gives rise to problems both in production engineering and circuit design. For example, to date no satisfactorily performing CCD delay lines accommodated in one housing and having a delay corresponding to two line periods of the PAL signal are available. Moreover, the clock frequency necessary for the comb-filtering of chrominance signals at their original frequency (3.58 MHz for NTSC and 4.43 MHz for PAL) is situated in a more problematic higher frequency range.

This may necessitate, inter alia, intricate shielding measures. Another disadvantage is the higher power dissipation which is inevitable in the case of a higher clock frequency and a large number of "buckets". Moreover, a separate PLL-circuit is needed for generating the clock signal, because this signal must be phase-locked to the chrominance carrier frequency.

SUMMARY OF THE INVENTION

Therefore, it is an object of the invention to provide a comb filter which mitigates the problems and drawbacks discussed above.

According to the invention this object is achieved by means of the characteristic features defined in the characterizing part of the appended claim 1. Advantageous embodiments are defined in the appended subsidiary claims.

The principal advantage of the invention is that the claimed comb filter enables a comparatively low clock frequency to be used. Moreover, the delay line of the claimed comb filter enables different delay times to be obtained by changing the clock frequency, so that for example both PAL and NTSC signals can be filtered by means of the same CCD delay line, which is of particular advantage in multi-standard video recorders. Further advantageous features will become apparent from the following description of the invention, given by way of example, with reference to FIGS. 1 to 3. In the drawings

DETAILED DESCRIPTION OF THE INVENTION

Figure 1:
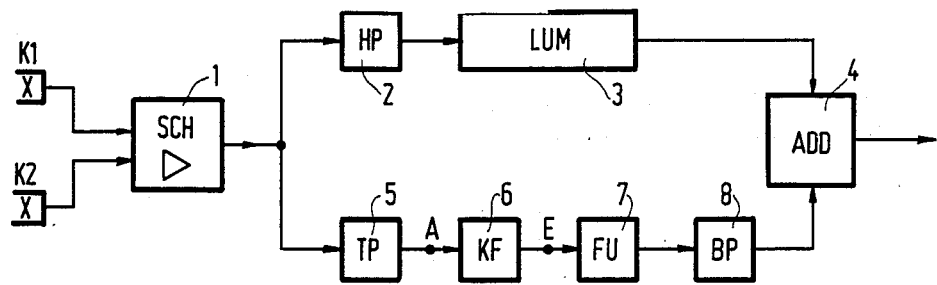
FIG. 1 shows a block diagram of a reproduction system including the comb filter in accordance with the invention.

FIG. 1 is a block diagram of a system for reproducing PAL colour video signals recorded on a VHS video recorder in accordance with the colour-under method. The recorded signals are read by means of the rotating video heads K1 and K2 and are combined to form a continuous signal in a head-switching and amplifier arrangement 1.

This continuous signal is applied to a high-pass filter 2, in which the frequency-modulated luminance component is extracted from the reproduced signal. The frequency-modulated luminance component is applied to a luminance reproduction circuit 3, where it is limited, frequency-demodulated, low-pass filtered and de-emphasised. The output signal of the luminance reproduction circuit 3 is applied to an adder 4.

The reproduced continuous signal is also applied to a low-pass filter 5, to extract the chrominance component, which has been down-converted (to 627 kHz for VHS) prior to recording, from the reproduced signal. The down-converted chrominance component is passed through a comb filter 6, to be described with reference to FIG. 2, to remove chrominance crosstalk components. The comb-filtered chrominance component is subsequently back-converted to its original frequency range (4.43 MHz) in a frequency converter 7, while at the same time the 90° phase shift introduced in every second track at the recording side is cancelled. The signal thus obtained is filtered in a band-pass filter 8 and applied to the adder 4 where it is combined with the frequency-demodulated luminance component to form the composite colour video signal to be reproduced.

Figure 2:
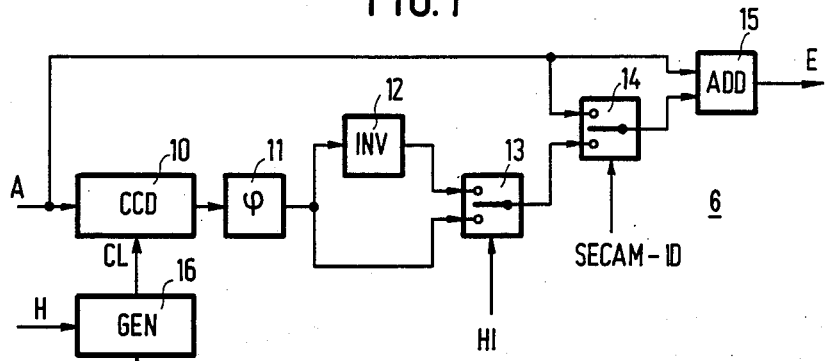
FIG. 2 shows a block diagram of the comb filter 6 in FIG. 1.

The comb filter 6 of FIG. 1 is described in more detail with reference to FIG. 2. The down-converted chrominance component is applied to terminal A. This component is fed to a clocked CCD delay circuit 10. The clock signal for the delay circuit 10 is generated in a clock generator 16, to be described in more detail with reference to FIG. 3. The output signal of the CCD delay circuit 10 is applied to a phase-correction circuit 11. The phase-correction circuit 11 is configured such that the overall delay of the chrominance component in the first signal path (caused by the CCD delay circuit 10 and the phase-correction circuit 11) corresponds to the period of the signal appearing on terminal A, which depends on the type of signal standard (PAL, NTSC) being used, and such that the phase shift of the down-converted chrominance component, which also depends on the signal standard and in addition depends on the recording standard (for example VHS) being used, is eliminated.

In the case of a PAL signal the overall delay is equal to two line periods of the PAL signal, i.e.

$$t_{PAL} = t_1 + t_2 = 128 \ \mu s$$

where
$t_1$ = the delay of the CCD delay circuit 10, and
$t_2$ = the delay of the phase-correction circuit 11.

Thus, the phase-correction circuit 11 should also eliminate the phase shift which depends on the recording standard in conjunction with the signal standard. In the case of a PAL signal the chrominance sub-carrier (colour-under carrier) has a frequency corresponding to 40.125 times the line frequency. This results in a 90° phase shift in the signal having a delay of two line periods, so that after addition to the non-delayed signal neither the desired signal doubling nor the desired cancellation of crosstalk components would be achieved. However, said 90° phase shift is compensated for by the phase-correction circuit 11. In practice the phase-correction circuit may be, for example, an all-pass filter network. However, it is also possible to use other phase-correction circuits with a linear frequency response.

In the case of an NTSC signal the overall delay corresponds to one line period of the NTSC signal, so that $$t_{NTSC} = t_3 + t_4 = 63.55 \ \mu s$$

where
$t_3$ = the delay in the CCD delay circuit 10, and
$t_4$ = the delay in the phase-correction circuit 11.

The phase-correction circuit 11 should also eliminate the phase shift which depends on the recording standard in conjunction with the signal standard. In the case of an NTSC signal the chrominance subcarrier (colour-under carrier) has a frequency corresponding to 40 times the line frequency, so that—in contradistinction to PAL—no undesired phase shifts caused by the selected chrominance subcarrier frequency occur. However, in the signal which has been delayed by one line period a 90° phase shift would arise, because phase-shifted signals are recorded in every track in conformity with the VHS-NTSC standard. As a result of this, the addition of the non-delayed and the delayed signals provide neither the desired doubling of the useful signal nor the cancellation of crosstalk components. However, this undesired 90° phase shift is also compensated for by the phase-correction circuit 11.

The output signal of the phase-correction circuit 11 is applied to a switch 13, both directly and via a phase inverter 12, which switch is turned on either for the direct signal or for the signal applied via the phase inverter 12. The switch 13 is controlled depending on the head-switch pulses HI, which also provide the change-over of the magnetic video heads in known manner. The switch 13 in conjunction with the phase inverter 12 serves to invert the phase of the delayed chrominance component in every second track, to ensure in combination with the phase-correction circuit 11 that said delayed component is in phase with the non-delayed signals.

From the output of the switch 13 the signal is applied to an adder stage 15 via further switch 14 which is only needed in multi-standard video recorders and which always transmits the output signal of the switch 13 for PAL or NTSC. The signal applied to the input A of the comb filter is also applied directly to said adder stage, so that the direct and the delayed signals are added to one another in the adder stage 15. During this addition the crosstalk components cancel each other and the useful signal amplitudes are added to each other. This results in the chrominance signal without crosstalk components on the output E of the adder 15 which signal can be further processed in a manner known per se (see also FIG. 1).

If the above comb filter is employed in a multistandard video recorder the switch 14 is set to its upper switch position in the case of the SECAM signal, which is identified by a SECAM identification circuit (not shown). Thus, if a SECAM signal is applied to an input A of the comb filter, the comb filter is rendered inoperative.

Figure 3:
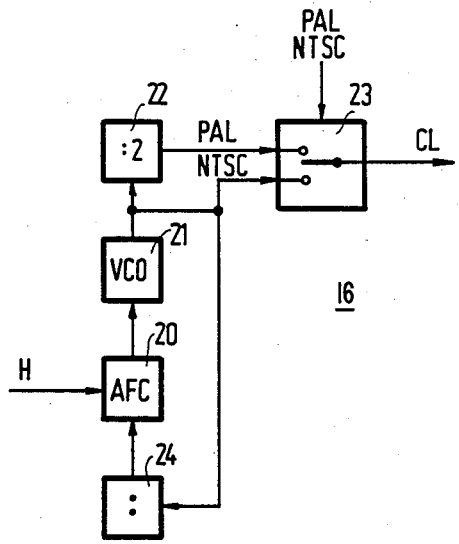
FIG. 3 shows a block diagram of the clock generator 16 in FIG. 2.

FIG. 3 shows a block diagram of a clock generator 16 which is constructed as a PLL circuit (see FIG. 2) and which is preferably used in a multi-standard video recorder. The line pulses, which are extracted from the reproduced signal and which exhibit time errors, are applied to an AFC circuit 20 of said clock generator 16. The AFC circuit 20 generates a control signal for controlling a voltage-controlled oscillator 21. A clock signal appearing on the output of the voltage-controlled oscillator 21 is applied to a first input of a switch 23 and via a divider 24 to the AFC circuit as the actual-value signal.

Further, the output signal of the voltage-controlled oscillator 21 is applied to a second input of the switch 23 via the divider 22 (having for example a dividing factor of 2). The switch 23 is controlled by an identification signal, which is derived for example from the servo circuit (not shown) or a colour identification circuit (not shown) of the video recorder, to indicate whether a PAL or NTSC signal is available. In the case of a PAL signal the switch 23 transmits the output signal of the divider 22. In the case of an NTSC signal the direct output signal of the voltage-controlled oscillator 21 is transmitted. The clock signal for the CCD delay circuit 10 of FIG. 2 is constituted by the output signal of the switch 23. Consequently, the CCD delay circuit 10 can be employed both for filtering PAL and for filtering NTSC signals by simply changing the clock frequency. As an alternative, the clock generator 16 in FIG. 3 may also be constructed by means of crystals. In that case it is necessary that the time error of the reproduced signal be small.

What is claimed is:

1. A comb filter for rejecting intertrack chrominance cross talk during reproduction of a recorded color video signal recorded according to a recording standard, said color video signal having a signal standard and comprising a chrominance signal having a phase shift related to said signal standard and said recording standard, said comb filter comprising:
   (a) a first signal path comprising a clocked CCD delay circuit for delaying said chrominance signal by a specific time interval thereby forming a delayed chrominance signal, and a first output coupled to said delay circuit for providing said delayed chrominance signal;
   (b) a second signal path having a second output for providing said chrominance signal; and
   (c) an adder stage coupled to said first and second outputs for adding said chrominance signal and said delayed chrominance signal;

characterized in that said first signal path comprises means for controlling the specific time interval of the delay provided to said chrominance signal in response to the period of the signal standard of said color signal and further comprises a phase correction circuit which eliminates said phase shift.

2. A comb filter as claimed in claim 1 wherein said signal standard is PAL and said recording standard is VHS and said color video signal is recorded on a plurality of tracks, said color video signal being recorded on a first group of said plurality of tracks without prior phase shifting and on a second group of said plurality of tracks with a 90° phase lag from line to line, characterized in that said specific time interval corresponds to the length of two line periods in the PAL standard and said first signal path further comprises a phase inverter which inverts the phase of said delayed chrominance signal so that said delayed chrominance signal and chrominance signal are in phase for all of said plurality of tracks being reproduced.

3. A comb filter as claimed in claim 2, characterized in that it is employed in a multi-standard video recorder, and—the clock signal for the CCD delay circuit (10) is generated in a PLL loop, to which the line pulses of the reproduced chrominance signal and a signal identifying the signal standard are applied and which automatically generates the clock signal required for the relevant signal standard.

4. A comb filter as claimed in claim 2, characterized in that the phase inverter is controlled by head-switch pulses (HI) intended for changing over the magnetic video heads.

5. A comb filter as claimed in claim 4, characterized in that it is employed in a multi-standard video recorder, and—the clock signal for the CCD delay circuit (10) is generated in a PLL loop, to which the line pulses of the reproduced chrominance signal and a signal identifying the signal standard are applied and which automatically generates the clock signal required for the relevant signal standard.

6. A comb filter as claimed in claim 1 wherein said signal standard is NTSC and said recording standard is VHS and said color video signal is recorded on a plurality of tracks, said color video signal being recorded on a first group of said plurality of tracks without prior phase shifting and on a second group of said plurality of tracks with a 90° phase lag from line to line, characterized in that said specific time interval corresponds to the length of two line periods in the NTSC standard and said first signal path further comprises a phase inverter which inverts the phase of said delayed chrominance signal so that said delayed chrominance signal and chrominance signal are in phase for all of said plurality of tracks being reproduced.

7. A comb filter as claimed in claim 1, characterized in that
   it is employed in a multi-standard video recorder, and the clock signal for the CCD delay circuit (10) is generated in a PLL loop, to which the line pulses of the reproduced chrominance signal and a signal identifying the signal standard are applied and which automatically generates the clock signal required for the relevant signal standard.

8. A comb filter as claimed in claim 7, characterized in that the PLL loop comprises a frequency divider (22) and a switch (23).

9. A comb filter as claimed in claim 8, characterized in that switching means (14) are provided which switching means are controlled by a SECAM identification circuit to render the comb filter inoperative when a SECAM signal is present.

10. A comb filter as claimed in claim 7, characterized in that switching means (14) are provided which switching means are controlled by a SECAM identification circuit to render the comb filter inoperative when a SECAM signal is present.

* * * * *